A. B. MUELLER.
MOTION PICTURE PROJECTION APPARATUS.
APPLICATION FILED NOV. 7, 1917.
1,317,636.  Patented Sept. 30, 1919.
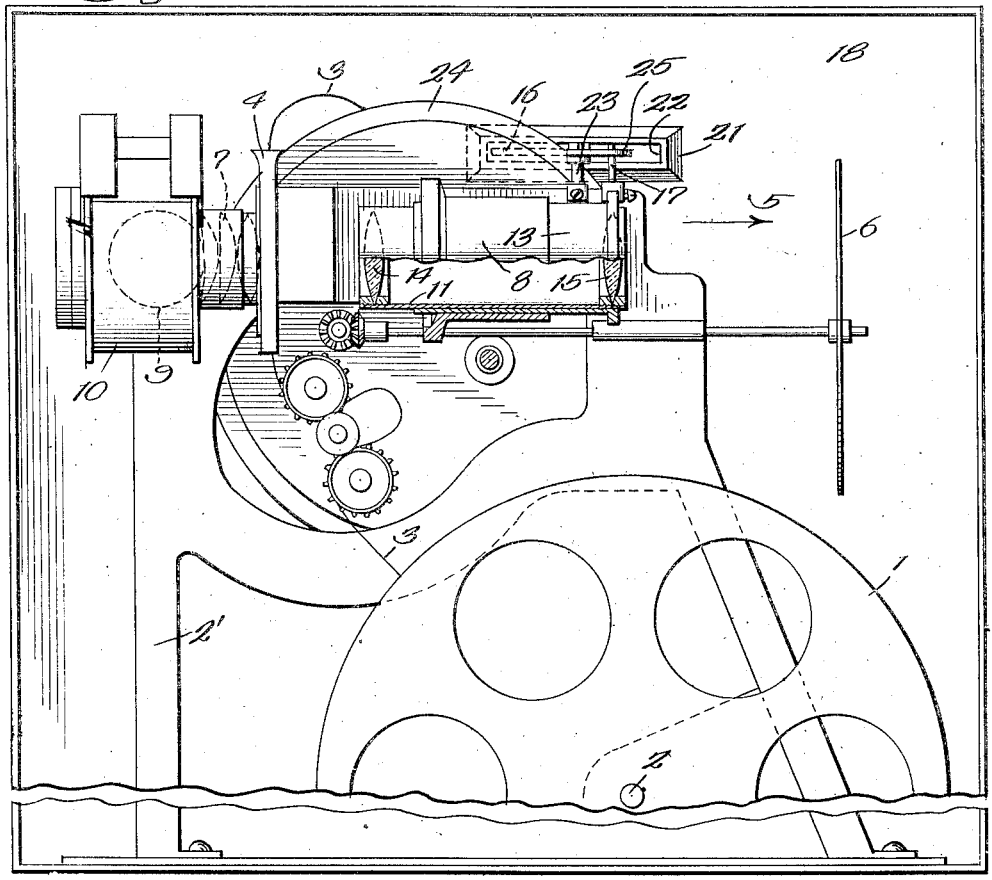
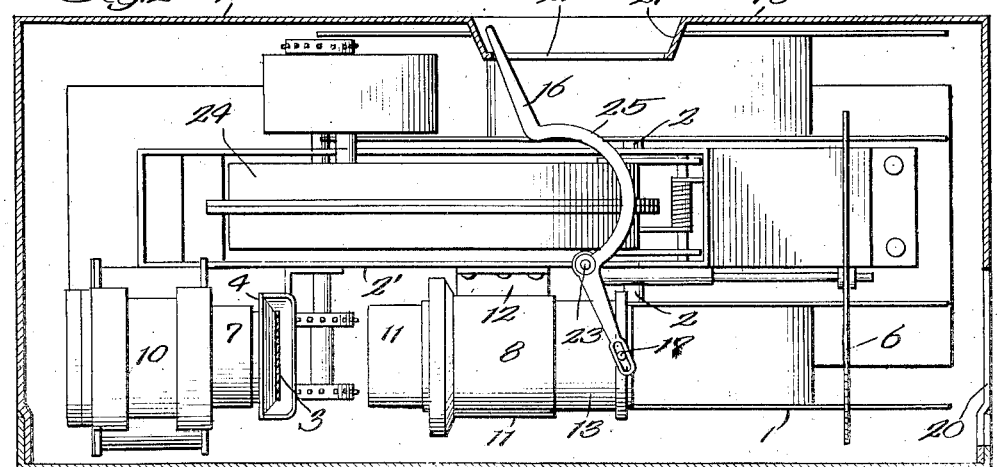

UNITED STATES PATENT OFFICE.

ALBERT B. MUELLER, OF CHICAGO, ILLINOIS.

MOTION-PICTURE-PROJECTION APPARATUS.

1,317,636.   Specification of Letters Patent.   Patented Sept. 30, 1919.

Application filed November 7, 1917. Serial No. 200,686.

*To all whom it may concern:*

Be it known that I, ALBERT B. MUELLER, citizen of the United States, residing at Chicago, in the county of Cook and State of Illinois, have invented a certain new and useful Improvement in Motion - Picture - Projection Apparatus, of which the following is a full, clear, concise, and exact description.

My invention relates to apparatus for projecting pictures upon screens, such apparatus being commonly known as motion picture projection apparatus.

My invention has for its object the provision of simplified means for adjusting the space intervening between the lenses of the projection lens structure of the apparatus. In practising my invention I provide one lens in each of two telescoping portions of a lens casing and connect one of these telescoping portions of the lens casing with a lever that is fulcrumed upon the framework of the apparatus and which lever projects through an opening in the casing that incloses the apparatus.

I will explain my invention more fully by reference to the accompanying drawing in which Figure 1 is a front view, with parts broken away owing to lack of space, the door or cover of the casing that contains the apparatus being removed; and Fig. 2 is a sectional plan view of the apparatus shown in Fig. 1.

Like parts are indicated by similar characters of reference in both figures.

That which is normally the supply reel (not shown) and the reel 1 which is normally the winding reel are mounted to turn upon a shaft 2 suitably supported in the framework $2^1$ of the apparatus. The film 3 is fed from the supply reel downwardly through a guide 4. The pictures upon the film are projected in the direction indicated by the arrow 5, there being a suitably operated shutter 6 that cuts off picture projecting light when each picture upon the film is being replaced by a succeeding picture at the usual rectangular openings in the guide 4 that register with each picture as it is being projected, the shutter permitting the light to pass when each picture is stationary at said openings, all as is well understood by those skilled in the art.

The guide 4 is disposed between the condensing lens structure 7 and projection lens structure 8. A lamp 9 is in a lamp house 10 and directs light through the condensing lens structure, the picture arrested in front of such structure, and the projection lens structure 8. The casing of the projection lens structure includes a stationarily mounted tubular portion 11 attached by means of a bracket 12 to the framework $2^1$. The casing of the projection lens structure also includes a tubular portion 13 in telescoping engagement with the tubular portion 11. The tubular portion 11 of the casing carries one of the projection lenses 14 while the tubular portion 13 carries another projection lens 15. The distance between these lenses is regulated by moving the tubular portion 13 forwardly and backwardly. For this purpose I provide an actuating lever 16 that is preferably in pin and slot connection 17 with the tubular portion 13. The apparatus is inclosed within a casing 18 that preferably has a door or cover 19 at its front side. This casing has an opening 20 in its front wall through which the picture projecting light rays pass toward the screen in the direction indicated by the arrow 5. The back wall $2^2$ of the casing is desirably extended inwardly in the region of the lever 16 as indicated at 21, the inward extension 21 of the casing 18 having an opening 22 at the inner face thereof and which opening is located in the plane of movement of the lever 16. The outer or handle end of the lever 16 projects through the opening 22 to a sufficient extent to enable it to be grasped for the purpose of turning the lever upon its fulcrum 23 that is upon the framework $2^1$ of the apparatus. The inwardly projecting portion 21 of the casing 18 affords a space in which the outer end of the lever 16 may be accommodated in accessible positions without projecting beyond the rear wall $2^2$ of the casing.

The mechanism for effecting the travel of the film includes the usual or suitable circular gear casing or head 24 which is located mainly but not altogether beneath the lever 16 and in order that the lever may be positioned in the place indicated it is forwardly bulged as shown at 25 to clear the gear casing or head 24.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. Motion picture projection apparatus including a guide through which picture bearing film is passed; a gear casing containing gearing for effecting the travel of film through the guide; a condenser lens structure to the rear of the guide; a projection lens structure in front of the guide having a casing formed of telescoping tubular parts; a frame for component parts of the apparatus; a lever fulcrumed upon the frame and in actuating engagement with one of the tubular parts of the casing of the projection lens structure, said gear casing being partially below said lever, the lever being forwardly bulged in the region of the gear casing to clear the same; and a casing inclosing the apparatus, said casing having an opening through which the lever extends to the exterior thereof to be accessible for operation.

2. Motion picture projection apparatus including a guide through which picture bearing film is passed; a condensing lens structure to the rear of the guide; a projection lens structure in front of the guide having a casing formed of telescoping tubular parts; a frame for component parts of the apparatus; a lever fulcrumed upon the frame and in actuating engagement with one of the tubular parts of the casing of the projection lens structure; and a casing inclosing the apparatus, said casing having an opening through which the lever extends to the exterior thereof to be accessible for operation.

In witness whereof, I hereunto subscribe my name this eighth day of October, A. D., 1917.

ALBERT B. MUELLER.